Figure 1:
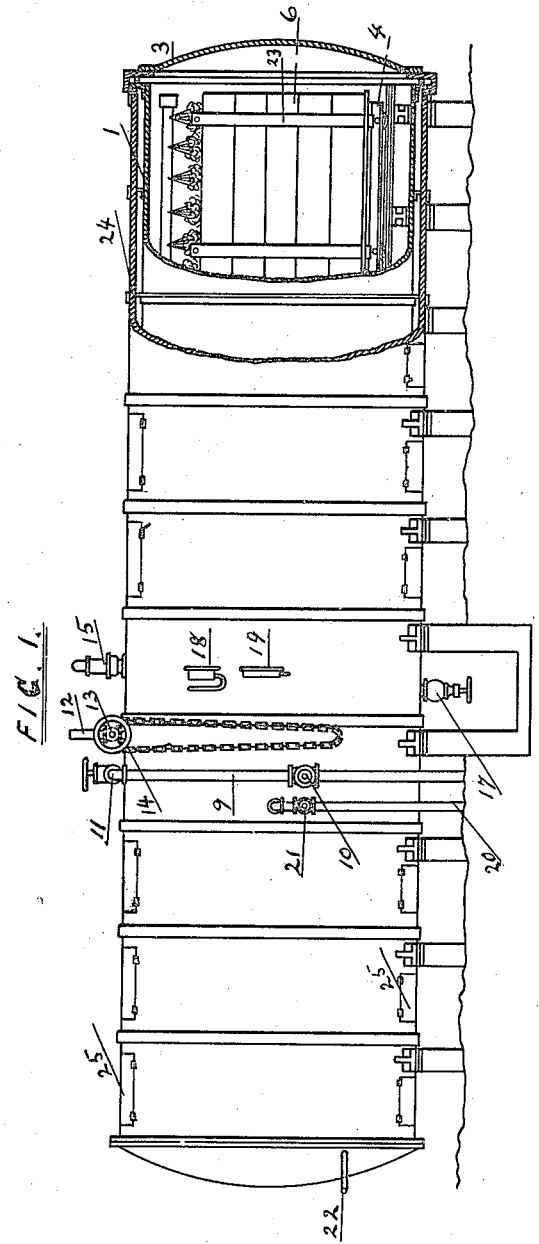

D. B. BANKS.
PROCESS OF DRYING AND EXTRACTING.
APPLICATION FILED MAY 20, 1916.

1,219,406.

Patented Mar. 13, 1917.
3 SHEETS—SHEET 1.

WITNESSES:
INVENTOR
BY
ATTORNEY

D. B. BANKS.
PROCESS OF DRYING AND EXTRACTING.
APPLICATION FILED MAY 20, 1916.

1,219,406.

Patented Mar. 13, 1917.
3 SHEETS—SHEET 2.

WITNESSES:

INVENTOR
Daniel B. Banks
BY
ATTORNEY

D. B. BANKS.
PROCESS OF DRYING AND EXTRACTING.
APPLICATION FILED MAY 20, 1916.
1,219,406.
Patented Mar. 13, 1917.
3 SHEETS—SHEET 3.
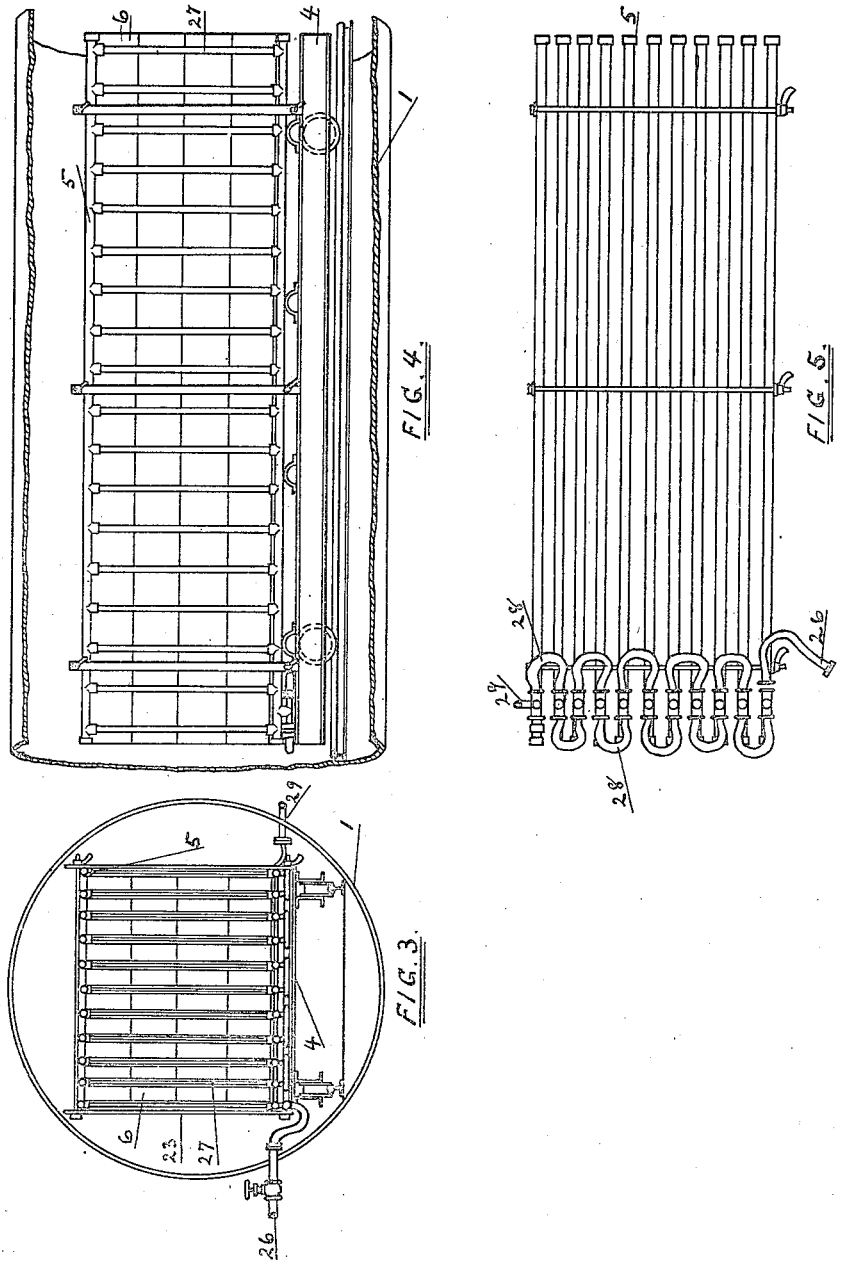

UNITED STATES PATENT OFFICE.

DANIEL B. BANKS, OF BALTIMORE, MARYLAND, ASSIGNOR TO THE D. B. BANKS COMPANY, A CORPORATION OF MARYLAND.

PROCESS OF DRYING AND EXTRACTING.

1,219,406.

Specification of Letters Patent.   Patented Mar. 13, 1917.

Application filed May 20, 1916.   Serial No. 98,940.

*To all whom it may concern:*

Be it known that I, DANIEL B. BANKS, a citizen of the United States, residing in Baltimore city, in the State of Maryland, have invented certain new and useful Improvements in the Processes of Drying and Extracting, of which the following is a specification.

This invention relates to the process of extracting from wood or other cellular, fibrous, or porous substances, the fluids contained therein, or developed therein during the process, or substances in suspension or solution in said fluids, and has for its object (*a*) the drying and seasoning of the cellular, fibrous, or porous substances and a conglomerate mass of the same, and (*b*) the extraction and collection of the fluids contained therein or developed therein during the process or substances in suspension or solution in said fluids.

In the modern processes of collecting fluids in wood or other cellular, fibrous, or porous substances by distillation the entire amount of fluids in such substances is evaporated and consequently the supply of heat required is large. In my process a large portion of the fluid is forced out of the containing substances without evaporation with a consequent reduction of time and expense of the process, and in some cases with a recovery of substances not recovered by the evaporating process.

With the foregoing and other objects in view my invention consists of the novel treatment, combination and arrangement of processes herein described and demonstrated by the accompanying drawings, wherein is shown an apparatus capable of having my process practised therein, but it is understood that changes, variations and modifications can be resorted to which come within the scope of the claims hereunto appended.

My process consists in placing wood or other cellular, fibrous, or porous substances in close proximity to a system of controllable heaters, such as a series of steam radiators, and inclosing the combination in a chamber wherein the wood or other substances can be raised to a high temperature under pressure in a saturated vapor. The pressure and temperature of the vapor are then lowered, but the saturated condition retained. The wood or other cellular, fibrous, or porous material cools more slowly and this cooling is further retarded by radiation supplied by the system of controllable heaters. The liquids within the wood or other cellular, fibrous, or porous substance are thus, at least some of them, at a temperature above their boiling point at the then existing pressure. Internal vaporization thereupon takes place, and the resulting internal pressure drives out of the wood, or other cellular, fibrous, or porous substance, unvaporized liquid.

The process is most efficient when saturation is maintained as above set forth. Slight variations from saturation, however, are compensated by surface evaporation from the material treated. So long as this is not excessive no damage is done.

The above process leaves the pores in an open and distended condition. All free liquid in the chamber is now withdrawn and dry heat applied until the temperature is brought to the proper point, either to evaporate any remaining liquids, or to produce desired chemical reactions, or to liquefy or volatilize other substances in the wood or other cellular, fibrous, or porous substances.

Figure 2:
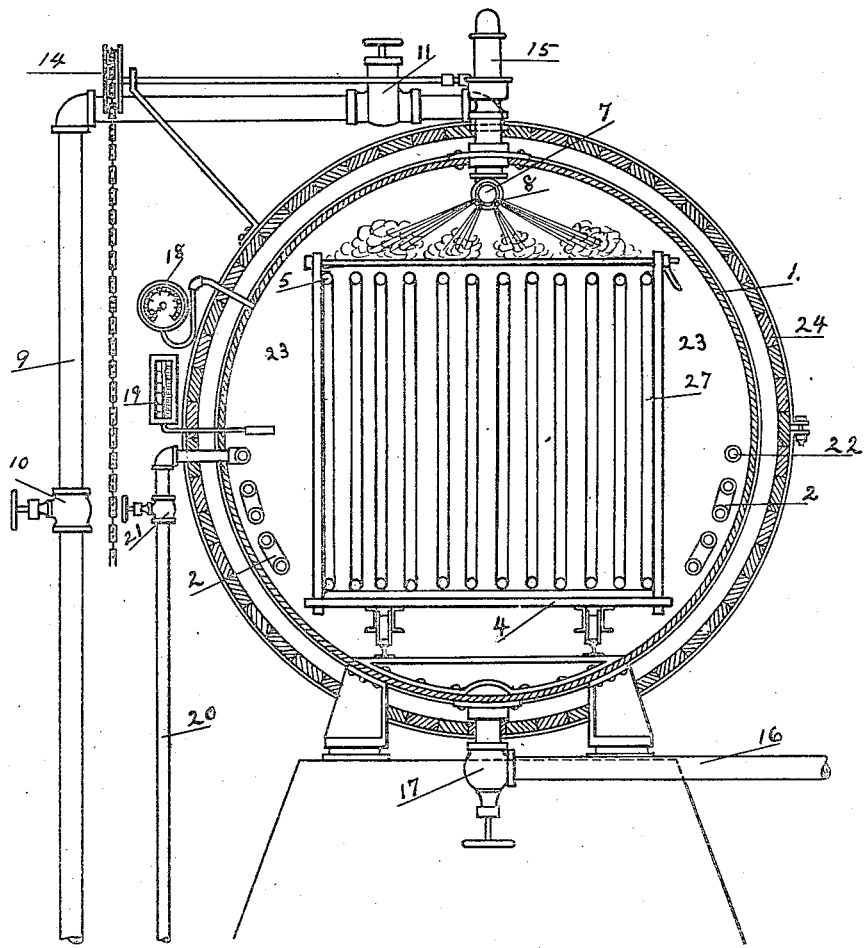

To more fully understand my process I will refer to the accompanying drawings in which Figure 1 shows a longitudinal view partly in section of an extractor. Fig. 2 a transverse section of the same. Fig. 3 is a transverse vertical section of the carriage in the shell showing the controllable heaters in position with the intervening spaces filled with lumber. Fig. 4 is a longitudinal half elevation half section of the car in position within the shell, showing the elevation of a controllable heater. Fig. 5 is a plan of the controllable heaters showing the flexible connections providing for adjustment of the spaces intervening between the various sections.

Similar numerals refer to similar parts throughout the several views.

1 is a shell of sufficient strength to withstand internal pressure and external pressures of such a range as practice may show to be necessary or advisable. 2 are pipes contained within the shell and are supplied with such heating or cooling fluids or gases as may be required. 3 is the door giving entrance to the extractor. 4 is a lumber buggy or car on which is stacked the lumber or substance to be dried or the substance from which extraction is to be made. 5 are the controllable heaters. 6 is lumber or substance to be dried or from which extraction is to be made. 7 is a steam or supply pipe. 8 are orifices or distributing vents in supply pipe 7, preferably arranged to direct the jets into the substance to be treated. 9 is an external pipe connected with supply pipe 7. 10 is a controlling valve in pipe 9. 11 is a regulating valve, preferably automatic, placed so as to control the pressure within shell 1. 12 is a blow-off orifice or pipe controlled by blow-off valve 13 operated by mechanism 14. 15 is a safety valve which may be set at any desired blow-off pressure. 16 is a drain controlled by drain valve 17. 18 is an absolute pressure gage for observing pressure within the shell. 19 is a thermometer for observing the temperature within shell 1. Pipes 2 are connected to pipe 20 and are controlled by valve 21 at one end and exhaust through pipe 22. 23 are the clamps on the sides of buggy 4 between which sides the lumber, if lumber is to be dried, is stacked edgewise with the controllable heaters between the same. 24 is an outside insulating protector forming an air space between it and shell 1. 25 are trap doors or openings in the top and bottom of outside insulating protection 24. 26 is a supply line through which steam or other heating fluid enters the controllable heater. 27 are radiating pipes forming the system of controllable heaters through which steam or other heating fluid passes. 28 are flexible connections joining the various controllable heaters. 29 is a discharge pipe through which the condensed steam or the heating fluid, if some other one is used, escapes. Controllable heaters have controlling valves not shown.

The operation of my process is as follows:

Lumber or any substance to be dried, or from which extraction is to be made, is placed in a suitable manner in the buggy 4 so that it is in close proximity to the controllable heaters: In the case of lumber, the treatment of which I will now more fully describe, as an illustration of my process, the lumber 6 is stacked edgewise with a controllable heater, made up pipes 27, between the stacks. The buggy 4 is then with its load placed in the kiln and the kiln sealed by means of door 3, trap doors 25 being closed. Steam is admitted into the kiln through orifices 8, with blow-off valve 13 and drain valve 17 preferably open to allow the escape of air and especially so if the pressure in the shell is later to be carried below atmospheric pressure. When the air has been practically displaced blow-off valve 13 is closed and drain valve 17 is closed except when it may be desired to remove fluids from the shell. Steam is allowed to continue to enter the shell until the desired pressure is reached.

The lumber and other contents of the shell condense the steam coming in contact with them until they are brought to the same temperature as the steam, the process as to the lumber being hastened if desired by the heat radiated and conducted through the lumber from the controllable heaters. The products of condensation are collected in the bottom of the shell from which any excess may be drawn off through drain valve 17, but enough should be left within the shell to insure complete saturation of the steam therein. The lumber being constantly in a saturated atmosphere no evaporation from the surface thereof takes place. After this process has continued long enough to secure a uniform temperature throughout the lumber, and other contents of the shell, the pressure is allowed to drop either by opening the blow-off valve 13, or by condensation through opening of the trap doors 25, producing a circulation of air between the shell 1 and the outer insulating protector 24; or by condensation caused by a flow of cold water through the pipes 2, or by other suitable means. The consequent drop in pressure is accompanied by a drop in the temperature of the steam remaining within the shell, but constant saturation is secured by the presence of the products of condensation in the shell, so that no large amount of evaporation takes place from the surface of the lumber. The interior of the lumber itself, however, cools more slowly than the surrounding steam and its cooling is still further retarded by the heat radiated from the controllable heaters, into which steam or other heating medium is now introduced. The fluids within the lumber are therefore at approximately the same temperature as before the pressure was reduced, that is at a temperature above the boiling point corresponding to the pressure to which they are now subjected. They therefore vaporize in sufficient quantity to take up this excess heat and the resulting internal pressure thus developed forces out a part of the remaining fluids within the lumber, together with any substances held in solution or suspension in such fluids. If the difference in temperature is too great too large an amount of vaporization is required to neutralize it, and the resulting internal pressure splits the lumber. The pressure must therefore be lowered slowly.

This process continues until the consumption of heat by this process of internal vaporization has restored, as to any remaining liquid in the lumber, an equilibrium between temperature and pressure, and may therefore be continued by a constant lowering of the pressure of the steam within the shell, either by a process of suction or by condensation, until the lowest practicable absolute pressure has been obtained within the shell. If the lumber is not sufficiently dry, steam may be again turned on through orifices 8 and the process repeated.

This process leaves the pores of the wood in an open and distended condition and if now all free liquids are withdrawn from the shell and the inlet valve 10, and the blow-off valve 13, and the drain valve 17 are closed, and heat supplied through the controllable heaters the temperature within the shell is raised to such a point that the evaporation of any remaining fluids in the wood is secured, the products of such evaporation being withdrawn through an appropriate outlet. This process may be regulated so as to bring about certain changes in the lignone complex, and other bodies remaining in the lumber, with the effect of increasing its tensile strength and decreasing its tendency to absorb moisture. When the evaporation and other changes described above are completed the lumber is withdrawn from the shell and allowed to cool.

In utilizing this invention and process to extract the fluids contained in wood or other cellular, fibrous, or porous substances or developed therein during the process, or substances contained in solution or suspension in said fluids, or any volatilizable substances contained in such wood or other cellular, fibrous, or porous substances, the operation is substantially as outlined above except that the lumber buggy is replaced by a suitable carriage and the form of the controllable heaters adapted to the particular substances to be operated upon.

Further, in such use, the second stage of the process is continued and heat supplied through pipes 2, the controllable heaters or other suitable means until the temperature within the shell is sufficient to cause decomposition of the cellular, fibrous, or porous substance, and the vaporization of volatilizable substances therein contained or produced as above, such vapors being removed through the drain 16 or other appropriate outlet.

Having thus described my process, what I claim and desire to secure by Letters Patent is:

1. The process of extracting fluids, substances contained in solution or suspension in such fluids and fusible substances from cellular, fibrous, or porous substances consisting of placing the same in proximity to a system of controllable heaters, inclosing such substances and controllable heaters in an inclosed shell filled with a saturated gaseous medium at a given pressure and heating the whole to the boiling point at the given pressure of the fluids or fusible substances which it is desired to remove from such cellular, fibrous, or porous substances, maintaining the saturation of the gaseous medium, and thereafter lowering the pressure and temperature of the gaseous medium while retarding the cooling of the cellular, fibrous, or porous substances by supplying heat through the controllable heaters with sufficient rapidity to maintain within such substances a temperature higher than the boiling point, at the reduced pressure of the surrounding medium, of the fluids or fusible substances which it is desired to remove from such substances, said lowering being continued until sufficient internal vaporization has been produced to expel the fluids contained in such substances.

2. The process of extracting fluids, substances contained in solution or suspension in such fluids and fusible substances from cellular, fibrous, or porous substances consisting of placing the same in proximity to a system of controllable heaters, inclosing such substances and controllable heaters in an inclosed shell filled with a saturated gaseous medium at a given pressure and heating the whole to the boiling point at the given pressure of the fluids or fusible substances which it is desired to remove from such cellular, fibrous, or porous substances, maintaining the saturation of the gaseous medium, and thereafter lowering the pressure and temperature of the gaseous medium while retarding the cooling of the cellular, fibrous, or porous substances by supplying heat through the controllable heaters with sufficient rapidity to maintain within such substances a temperature higher than the boiling point, at the reduced pressure of the surrounding medium, of the fluids or fusible substances which it is desired to remove from such substances, said lowering being continued until sufficient internal vaporization has been produced to expel the fluids contained in such substances, and then subjecting such substances to the action of heat in a non-saturated gaseous medium.

DANIEL B. BANKS.

Witnesses:
W. W. CLOUD,
EDW D. RAWLES.